United States Patent [19]

Termont

[11] 4,088,364
[45] May 9, 1978

[54] ENVIRONMENTAL CONTROL SYSTEM AND CAB COMBINATION

[75] Inventor: Charles George Termont, Dubuque, Iowa

[73] Assignee: Deere & Company, Moline, Ill.

[21] Appl. No.: 735,382

[22] Filed: Oct. 26, 1976

[51] Int. Cl.² .......................................... B62D 27/00
[52] U.S. Cl. .................................. 296/28 C; 98/2.14; 180/89.12
[58] Field of Search ................ 296/28 C, 28 R, 35 R; 98/2, 2.05, 2.06, 2.11, 2.14, 2.15; 180/89.12

[56] References Cited

U.S. PATENT DOCUMENTS

| 2,203,814 | 6/1940 | Clements | 98/2.05 |
| 2,551,528 | 5/1951 | Darrin | 98/2 |
| 3,776,358 | 12/1973 | Williams | 296/28 C |
| 3,777,648 | 12/1973 | McGowan | 98/2.15 |
| 3,868,896 | 3/1975 | Doll | 98/2.15 |
| 3,924,524 | 12/1975 | Whisler | 98/2.05 |

FOREIGN PATENT DOCUMENTS

| 2,023,879 | 11/1971 | Germany | 98/2.11 |
| 1,316,429 | 5/1973 | United Kingdom | 98/2.14 |

Primary Examiner—Joseph F. Peters, Jr.
Assistant Examiner—John A. Carroll

[57] ABSTRACT

The framework and operator seat support structure of a cab form part of the ductwork for an environmental control system including a pair of blowers and cooling and heating coils mounted in a hollow arm rest support portion of the seat support structure.

8 Claims, 1 Drawing Figure

U.S. Patent     May 9, 1978     4,088,364
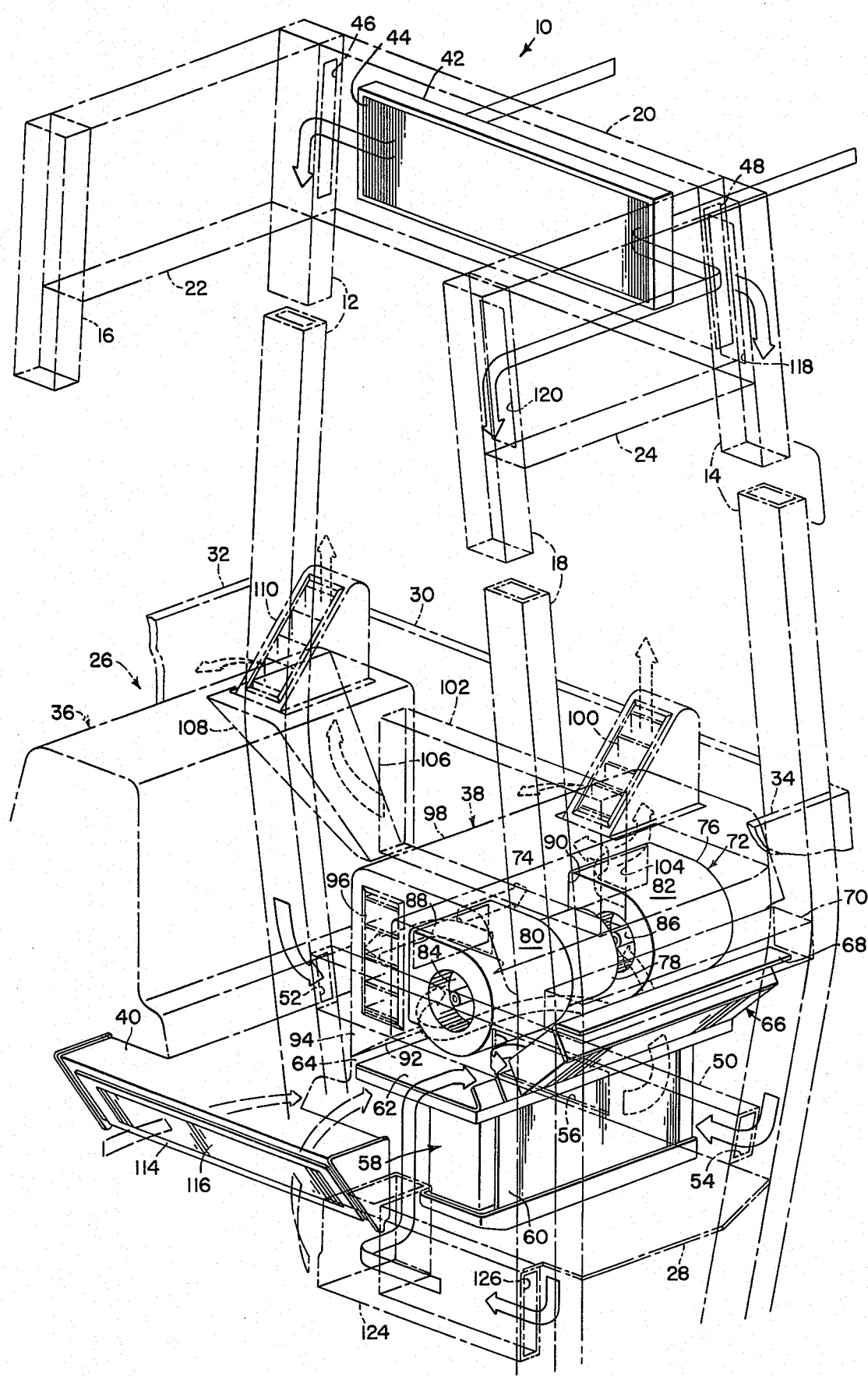

ENVIRONMENTAL CONTROL SYSTEM AND CAB COMBINATION

BACKGROUND OF THE INVENTION

The present invention relates to an integrated cab and cab environmental control system design.

Heretofore, environmental control systems have more-or-less been just added on to existent cab structures. The most common of these added on systems are those which include operational components mounted in a housing on the cab roof. Not only does this type of system add to the over all height of the cab thus requiring more overhead elements for the passage of the vehicle, but it also is located such that the operational components are subjected to relatively high vibrations.

SUMMARY OF THE INVENTION

According to the present invention there is provided a novelly integrated cab and environmental control system.

It is a broad object of the invention to provide an integrated cab and environmental control system wherein the system occupies normally unused space in the cab without subtracting from the free space provided for the operator's comfort and safety.

A more specific object of the invention is to provide an environmental control system integrated into a cab such that structural members of the cab form at least a major part of the air ductwork and component housing for the system.

These and other objects will become apparent from reading the ensuing description together with the appended drawing.

BRIEF DESCRIPTION OF THE DRAWING

The sole FIGURE is a schematic perspective view of a portion of an integrated cab and environmental control system with parts removed and with the structural parts of the cab being shown in dashed lines to expose the arrangement of the blower, the heating coils and the air conditioning coils of the environmental control system.

DESCRIPTION OF THE PREFERRED EMBODIMENT

Referring to the drawing, therein is shown an integrated cab and environmental control system indicated in its entirety by the reference numeral 10. The integrated cab and system 10 includes cab framework comprising right and left rear upright tubular corner posts 12 and 14, respectively, and a pair of right and left front upright tubular corner posts 16 and 18, respectively. The upper ends of the rear posts 12 and 14 are joined together by an upper rear tubular crossmember 20 while the upper ends of the right posts 12 and 16 are joined by an upper fore-and-aft extending tubular member 22 and the upper ends of the left posts 14 and 18 are joined by an upper fore-and-aft extending tubular member 24.

Forming a part of the interior of the cab is an operator seat support structure 26 which is supported on a floor 28 of the cab and cooperates with a back wall portion 30, and right and left sidewall portions 32 and 34, respectively, of the cab to define a hollow chamber. Specifically, the structure 26 includes right and left upright arm rest supports 36 and 38, respectively, and a horizontal seat cushion support plate 40 spaced vertically above the floor 28 and extending between lower portions of the supports 36 and 38.

A fresh air (flow indicated by solid line arrows) intake duct 42 is mounted on the exterior of the cab on an exposed rear surface of the crossmember 20 and is in communication with the interior of the latter. The duct 42 serves as a container for an air intake filter 44. Air passes from opposite open ends of the member 20 into inlet openings 46 and 48 respectively provided in the posts 12 and 14. A second open ended, tubular crossmember 50 joins the posts 12 and 14 at a location just above the level of the seat cushion support plate 40 and the posts 12 and 14 are respectively provided with outlet openings 52 and 54 in register with the opposite open ends of the crossmember 50. An opening 56 is located in a forward side portion of the crossmember 50 and opens into the back of the left arm rest support 38. An air conditioning unit 58 is mounted on the support plate 40 just leftwardly of the opening 56 and extends completely fore-and-aft across the interior of the support 38. A left upright surface 60 of the unit 58 is spaced rightwardly from the left wall portion 34 of the cab. A horizontal baffle plate 62 is positioned against the top of the unit 58 and extends completely fore-and-aft across the interior of the support 38 and extends transversely between a right inner wall 64 of the support 38 and a location approximately in line with the surface 60 of the unit 58. Extending fore-and-aft across the interior of the support 38 and angled upwardly and leftwardly from the left side of the baffle plate 52 is a heater unit 66 having an angled mounting bracket 68 fixed along a top edge thereof and to the underside of a fore-and-aft extending member 70 having opposite ends respectively joined to the posts 14 and 18.

Mounted in the arm rest structure 38 above the baffle plate 62 and leftwardly of the heater unit 66 is a blower unit 72 comprising front and rear fan units 74 and 76, respectively, driven by an electric motor 78 located therebetween. The fan units 74 and 76 respectively, include housings 80 and 82 respectively provided with axial inlet openings 84 and 86 and with tangential outlet openings 88 and 90. A slanted partition 92 extends fore-and-aft across the interior of the structure 38 and joins a location of the wall 64 just above the baffle plate 62 with the blower unit 72 so as to prevent recirculation of the air forced through the outlet openings 88 and 90.

Located above the portion 92 in a front wall 94 of the structure 38 is a forwardly facing louvred air discharge opening 96 and mounted in a rear portion of a top wall 98 of the structure 38 is an upwardly and forwardly facing louvred conditioned air (flow indicated by dashed line arrows) discharge opening 100. A cross duct 102 extends between the rear upper portion of the wall 64 and a similar location of an inner wall 104 of the right arm rest support 36. The opposite ends of the cross duct 102 are in register with openings 104 and 106 respectively, provided in the walls 64 and 104. Connected to the opening 106 is a transfer duct 108 which leads to an upwardly and forwardly facing louvred air discharge opening 110 mounted in a rear portion of a top wall 112 of the structure 36.

The recirculation of the air inside the cab through the air conditioning and heating units 58 and 66 is provided by a recirculation air (flow indicated by broken line arrows) intake duct 114 provided in a central forward portion of the structure 26 at a location between the floor 28 and the support plate 40. The duct 114 serves to contain a filter 116 which filters inside air as it passes therethrough on its way to the bottom of the cavity defined by the left arm rest support structure 38.

If desired, an additional path may be provided for routing fresh air to the air conditioning and heating units 58 and 66. Specifically, the left rear and front posts 14 and 18 may be provided with respective openings 118 and 120 disposed in register with the opposite open ends of the left tubular member 24 and a transfer duct 124 may be coupled between an outlet opening 126 provided in a lower portion of the post 18 and the bottom of the interior of the arm rest support structure 38 at a location just rightwardly of the air conditioning unit 58.

The operation of the integrated cab and environmental control system 10 is thought to be clearly evident from the foregoing description and for the sake of brevity, no further discussion is presented.

I claim:

1. An environmental control system and cab combination, comprising: a cab framework including at least one upper horizontally disposed tubular member having opposite open ends; fresh air inlet duct means joined to the tubular member for conveying air from outside the cab into the tubular member; a pair of upright tubular support posts respectively joined to and respectively provided with a pair of inlet openings in communication with the opposite open ends of the tubular member; said posts further being respectively provided with a pair of outlet openings; an operator seat support structure defining a hollow chamber; air blower means mounted in said chamber and having inlet and outlet means; air supply duct means defined at least in part by said chamber and extending between the pair of outlet openings of the support posts and blower means inlet; air conditioning coil means and air heating coil means located in the chamber in said air supply duct means; and air discharge duct means, including conditioned air outlet means leading from the chamber connected to the blower means outlet means.

2. The combination recited in claim 1 wherein said chamber includes right and left upwardly projecting portions defining right and left arm rest supports of the seat support structure; and said air conditioning and heating coil means and air blower means being located in one of the upwardly projecting portions.

3. The combination defined in claim 2 wherein said air outlet means include an outlet in each of the upwardly projecting portions; and said seat support including a tubular back support member extending between rear portions of the upwardly projecting portions and forming part of said discharge duct means.

4. The combination defined in claim 2 wherein said seat support structure includes a generally horizontal cushion support portion extending between and joining respective lower portions of the right and left upwardly projecting portions; and an interior air inlet duct means being provided in the cushion support portion such as to convey air from inside the cab to the supply air duct means for recirculation through the air heating and air conditioning coil means.

5. The combination recited in claim 1 wherein said support posts form right and left rear corner posts of the cab and said supply duct means includes a second horizontally disposed tubular member having opposite open ends respectively joined to the pair of upright posts in communication with the pair of outlet openings.

6. The combination defined in claim 3 wherein the one tubular member forms an upper rear crossmember of the framework and wherein the second tubular member forms an intermediate crossmember of the framework extending behind the seat support structure and is provided with a central opening disposed in communication with the chamber.

7. The combination defined in claim 1 and further including an interior air inlet duct means provided in the seat support structure such as to convey air from inside the cab to the supply air duct means for recirculation through the air heating and air conditioning coil means.

8. The combination defined in claim 1 wherein the one tubular member is located adjacent the top of the cab.

* * * * *